United States Patent
Park et al.

(10) Patent No.: US 11,499,697 B2
(45) Date of Patent: Nov. 15, 2022

(54) VEHICLE HEADLIGHT FOR IMPROVING VISIBILITY DURING OPERATION

(71) Applicant: KREMS CO., LTD, Gumi-si (KR)

(72) Inventors: Jae Wook Park, Gumi-si (KR); Myoung Sung Moon, Gumi-si (KR); Bong Sang Lee, Gumi-si (KR)

(73) Assignee: KREMS CO., LTD, Gumi-si (KR)

( * ) Notice: Subject to any disclaimer, the term of this patent is extended or adjusted under 35 U.S.C. 154(b) by 806 days.

(21) Appl. No.: 16/349,376

(22) PCT Filed: Feb. 7, 2017

(86) PCT No.: PCT/KR2017/001341
§ 371 (c)(1),
(2) Date: May 13, 2019

(87) PCT Pub. No.: WO2018/117330
PCT Pub. Date: Jun. 28, 2018

(65) Prior Publication Data
US 2019/0368688 A1     Dec. 5, 2019

(30) Foreign Application Priority Data

Dec. 21, 2016  (KR) .................. 10-2016-0175982

(51) Int. Cl.
| | |
|---|---|
| F21V 9/08 | (2018.01) |
| B60Q 3/72 | (2017.01) |
| F21S 41/60 | (2018.01) |
| C08K 5/07 | (2006.01) |
| G02B 5/22 | (2006.01) |

(52) U.S. Cl.
CPC ................ F21V 9/08 (2013.01); B60Q 3/72 (2017.02); C08K 5/07 (2013.01); F21S 41/60 (2018.01); G02B 5/22 (2013.01)

(58) Field of Classification Search
None
See application file for complete search history.

(56) References Cited

U.S. PATENT DOCUMENTS

2015/0291880 A1   10/2015   Okuyama et al.

FOREIGN PATENT DOCUMENTS

| JP | H1125709 A | 1/1999 |
|---|---|---|
| JP | 2008-505437 A | 2/2008 |
| JP | 2013187145 A | 9/2013 |
| KR | 10-1998-0008776 A | 4/1998 |
| KR | 10-2001-0077691 A | 8/2001 |
| KR | 10-2016-0049101 A | 5/2016 |

(Continued)

OTHER PUBLICATIONS

Extended European Search Report, European Application No. EP 17 88 4142, dated May 27, 2020, 10 pages.

(Continued)

*Primary Examiner* — Elmito Breval
(74) *Attorney, Agent, or Firm* — United One Law Group LLC; Kongsik Kim; Jhongwoo Peck

(57) ABSTRACT

Disclosed herein is a vehicle headlight for improving visibility during operation. In the vehicle headlight, a filtering film capable of preventing glare and reducing a discomfort glare phenomenon by controlling scotopic vision (S)/photopic vision (P) ratio in such a manner as to selectively absorb/block blue light in light emitted from an LED module is adhered, thereby improving visibility during operation.

5 Claims, 8 Drawing Sheets

(56) References Cited

FOREIGN PATENT DOCUMENTS

| KR | 10-1639057 B1 | 7/2016 |
|---|---|---|
| WO | 2015/111483 A1 | 7/2015 |

OTHER PUBLICATIONS

Anonymous: "Courtesy headlight dimmer—a unique application of "daytime running lights" for the Japanese market," Research Disclosure, Kenneth Mason Publications, Hamp-shire, UK, GB, vol. 410 (7): 1 page (1998).

FIG. 5

| | Reference LED PKG | After application of filter |
|---|---|---|
| Color temperature (K) | 5035 | 4205 |
| Luminous flux (lm) | 38575(100%) | 24056(62.4%) |
| S/P ratio | 1.904 | 2.004 |
| CRI | 82 | 88 |
| Filter transmittance | | |
| | | |

FIG. 8

VEHICLE HEADLIGHT FOR IMPROVING VISIBILITY DURING OPERATION

CROSS-REFERENCES TO RELATED APPLICATIONS

This application is a U.S. national phase application, pursuant to 35 U.S.C. § 371, of PCT/KR2017/001341, filed Feb. 7, 2017, designating the United States, which claims priority to Korean Application No. 10-2016-0175982, filed Dec. 21, 2016. The entire contents of the aforementioned patent applications are incorporated herein by this reference.

BACKGROUND

1. Technical Field

The present disclosure relates generally to a vehicle headlight, and more specifically to a vehicle headlight for improving visibility during operation, in which a filtering film capable of preventing glare and reducing a discomfort glare phenomenon by controlling scotopic vision (S)/photopic vision (P) ratio in such a manner as to selectively absorb/block blue light in light emitted from an LED module is adhered, thereby improving visibility during operation.

2. Description of the Related Art

Blue light refers to "the 400-500 nm visible light spectrum of blue and violet colors" called "High-Energy Visible Light (HEV light)" in ophthalmology. HEV light has been suspected of causing age-related macular degeneration.

The risk of blue light is the possibility of causing retinal damage when the eye is exposed to the wavelength of visible light within the range of 400 to 500 nm. Experimental researches on humans have not yet been conducted as of 2007, and animal experiments have been conducted on some rodents and primates.

Under normal conditions, when light reaches a photoreceptor of the retina, a corresponding cell stops its activity until it is restored through a metabolic process. Meanwhile, in animal experiments on rats, blue light having a wavelength of 430 nm enhanced the potential for cellular oxidative damage. Other researches showed that 1 to 2 min exposure at a wavelength of 408 nm and 25 min exposure at a wavelength of 430 nm resulted in permanent damage to receptor cells and retinal epithelial lesions.

Therefore, it is necessary to block such blue light because it causes strong glare to a person onto which the blue light is radiated and produces a discomfort glare phenomenon.

Accordingly, various methods of reducing blue light have been proposed. However, in the case of a blue light reduction structure from which the light of an LED module itself excluding blue light is emitted, problems arise in that the cost of the Led module itself increases and blue light cannot be effectively reduced.

In recent years, LED headlamps, which have been mainly applied to the headlights of luxury cars, have the strong possibility of being applied to the headlights of general vehicles. Therefore, the LED headlamp market is growing rapidly. As a result, there is a demand for the development of a more competitive light source.

There are an increasing number of cases where LED headlamps are applied to vehicle headlights. However, so far, the focus has been on the development of LED headlamps themselves. Accordingly, development for improving the performance of LED headlamps needs to be performed next.

Particularly, in order to prevent safety-related accidents, it is essential to improve the visibility of vehicles. However, no attempt has been made to attach a special film to a vehicle headlight as an attempt to improve visibility.

PRIOR ART DOCUMENTS

Patent Documents (Patent document 1) Korean Patent Application Publication No. 10-2015-0123383 published on Nov. 4, 2015

(Patent document 2) Korean Patent No. 10-0753660 issued on Aug. 23, 2007

(Patent document 3) Korean Patent No. 10-1395498 issued on May 8, 2014

SUMMARY

The present invention has been conceived to overcome the above-described problems, and an object of the present invention is to provide a vehicle headlight for improving visibility during operation, in which a blue light absorbing/blocking filtering film capable of preventing glare and reducing a discomfort glare phenomenon by controlling S/P ratio in such a manner as to selectively absorb/block blue light in light emitted from an LED module is adhered, thereby improving visibility during operation.

In order to accomplish the above object, the present invention provides a vehicle headlight system in which a filtering film configured to absorb/block blue light included in white light emitted from a vehicle headlight is adhered and a sensor operates via an input signal regarding the accelerator, RPM, brake, or clutch of a vehicle, wherein: when the input signal is input from the sensor and transferred to a microprocessor, the input signal operates the vehicle headlight via a control switch coupled to the vehicle headlight; when the vehicle stops, the microprocessor having received a brake signal of the vehicle turns off the vehicle headlight by operating the control switch; and when the vehicle starts, the microprocessor having received an accelerator signal of the vehicle turns on the vehicle headlight by operating the control switch.

In order to accomplish the above object, the present invention provides a vehicle headlight for improving visibility during operation, wherein a filtering film configured to absorb/block blue light included in white light is adhered, and the filtering film includes 25 to 90 parts by weight of an acrylic monomer, 4 to 30 parts by weight of a photoinitiator, 0.2 to 10 parts by weight of a leveling agent, and 3 to 15 parts by weight of a UV absorbent, based on 100 parts by weight of a urethane acrylate oligomer.

The photoinitiator may be an a-hydroxy ketone.

The leveling agent may be polyether-modified trisiloxane or a silicon-based leveling agent.

The UV absorber may be an ester-based UV absorber having a methoxyphenyl methylene group or a pentamethyl piperidinyl group.

The filtering film may include: a liner configured to be adhered to a surface of the vehicle headlight; a film base configured to be attached to the top surface of the liner; an adhesive configured to adhere the film base and the liner to each other; a top coating surface configured to be applied to the top surface of the film base; and a protective surface configured to be re-applied to the top surface of the top coating surface.

The vehicle headlight may further include a means configured to selectively lift and lower a lens including the filtering film in front of the vehicle headlight, and the vehicle headlight may be covered with the lens.

BRIEF DESCRIPTION OF THE DRAWINGS

The above and other objects, features, and advantages of the present invention will be more clearly understood from the following detailed description taken in conjunction with the accompanying drawings, in which:

FIG. 5 is a reference view showing the results of variations in S/P ratio and color temperature (5000 K→4000 K);

FIG. 8 shows data on the subjective evaluation of glare based on the colors and the turning on and off of LED lighting.

DETAILED DESCRIPTION

The advantages and features of the present disclosure and methods for achieving the advantages and the features will be apparent from embodiments that will be described in detail below in conjunction with the accompanying drawings. However, the present disclosure is not limited to the embodiments disclosed below, but may be implemented in various different forms. The present embodiments are provided merely to make the present disclosure complete and to fully convey the scope of the present disclosure to those having ordinary knowledge in the art to which the present disclosure pertains. The present disclosure is defined only by the scope of the attached claims. In this specification, a singular form also includes a plural form unless the context clearly dictates otherwise. Throughout the specification, the same reference symbols designate the same components.

Furthermore, in the following description of the embodiments of the present disclosure, when it is determined that a detailed description of a related well-known configuration or function may make the gist of the present invention obscure, the detailed description will be omitted. Furthermore, terms that will be described later are terms that are defined by taking into account their functions in the present invention, and may vary depending on a user, the intention of an operator, or practice. Therefore, the definitions of the terms must be made based on the context of the overall present specification.

Embodiments of the present disclosure will be described in detail below with reference to the accompanying drawings. Meanwhile, illustrations and detailed descriptions of components apparent to those having ordinary knowledge in the art to which the present disclosure pertains and the operations and effects of the components will be abridged or omitted, and detailed descriptions will be given with a focus on the components related to the present disclosure.

Figure 1:
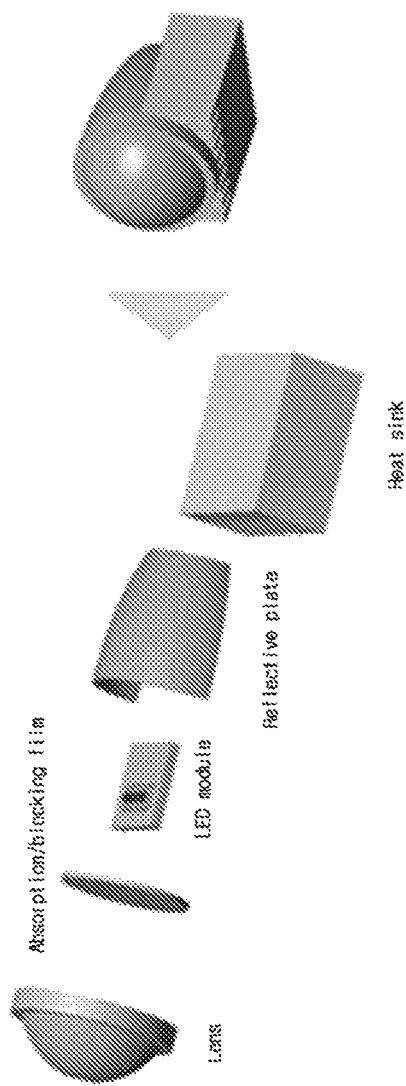
FIG. 1 is a view showing the configuration of a vehicle headlight according to the present disclosure.

As shown in FIG. 1, a vehicle headlight for improving visibility during operation according to the present disclosure is intended to improve visibility through discomfort glare control and an increase in S/P ratio by adhering a filtering film 220 configured to absorb/block blue light included in white light to a lens.

Figure 3:
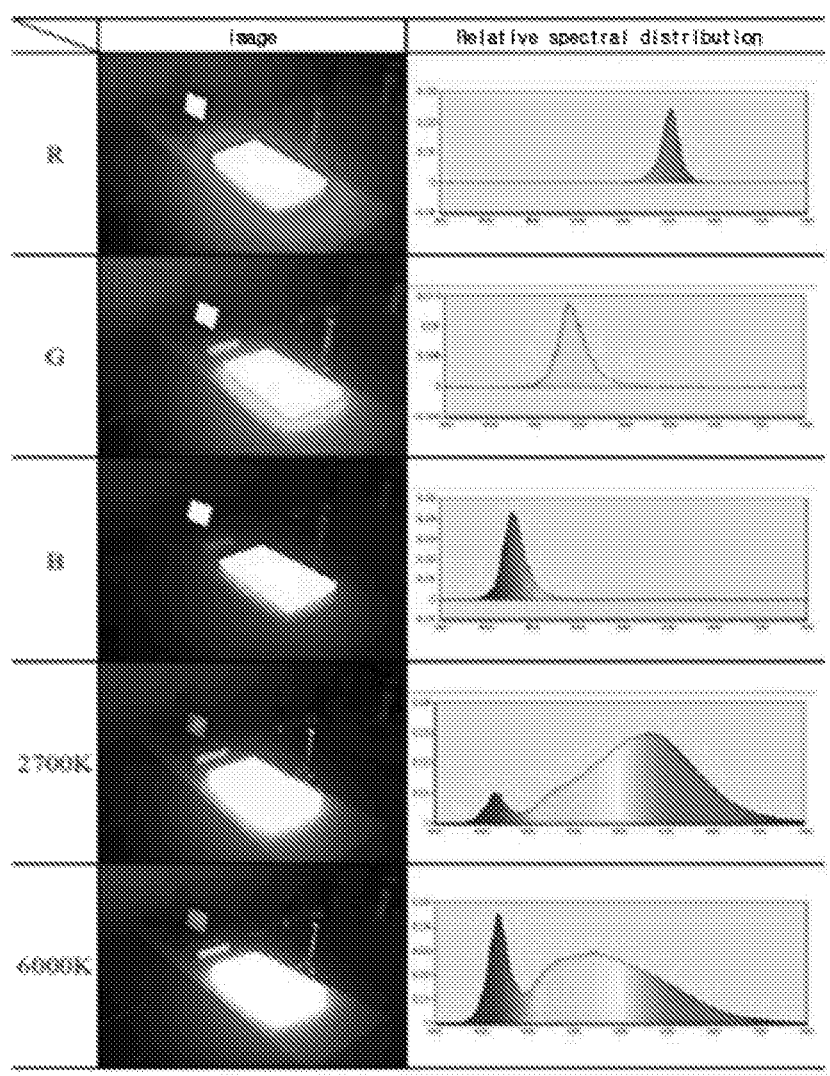
FIG. 3 is a reference view showing the subjective evaluation of glare based on the colors of LED lighting having the same color temperature.

More specifically, the risk of blue light is that retinal damage may be caused when the eye is exposed to the wavelength of visible light within the range of 400 to 500 nm. As shown in FIG. 3, in connection with a discomfort glare phenomenon, when the same luminance of 40 cd/m$^2$ was given, a glare rating (GR) value of 2.6 was measured for red light, a GR value of 2.8 was measured for green light, a GR value of 4.1 was measured for blue light, a GR value of 1.6 was measured for 2700 K light, and a GR value of 2.7 was measured for 6000 K light. Accordingly, the blue wavelength series has the highest GR values, and is considered to be a main cause of the discomfort glare phenomenon.

A glare phenomenon refers to a phenomenon in which when an object having considerably high luminance or a high luminance contrast is present in a field of vision, glare occurs and, at the same time, an unpleasant feeling occurs. The reason for this is that even when a person feels that an object is visible to his or her eyes, the excessive adjustment of the pupils, the retinas, the brain, etc. is performed due to the excessively high luminance or strong luminance contrast in the field of vision, and causes discomfort and the nervous fatigue of the eyes.

Figure 6:
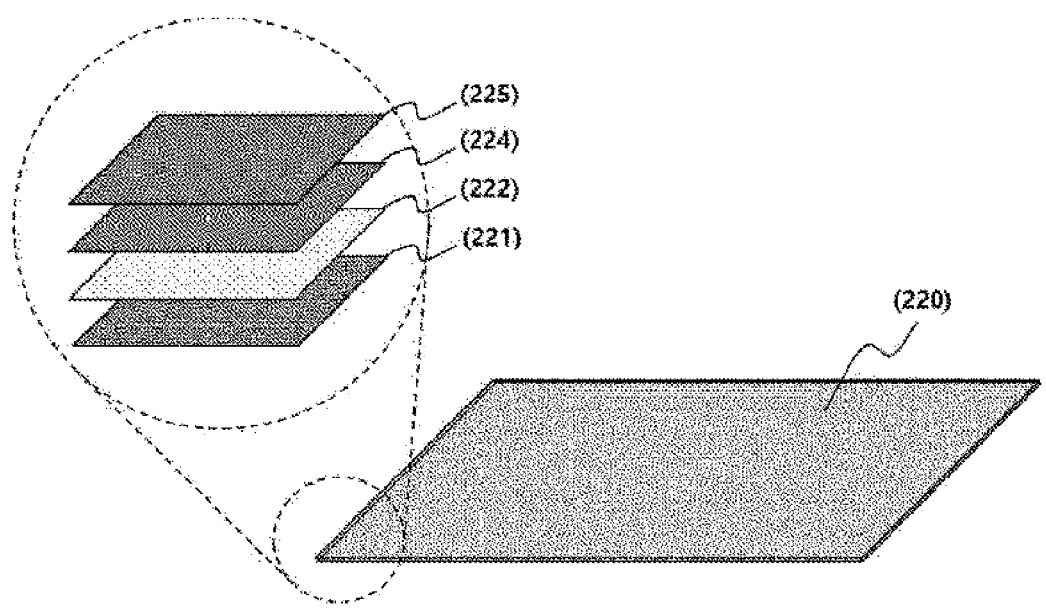
FIG. 6 is a diagram showing the detailed configuration of a film according to an embodiment of the present disclosure.
Figure 7:
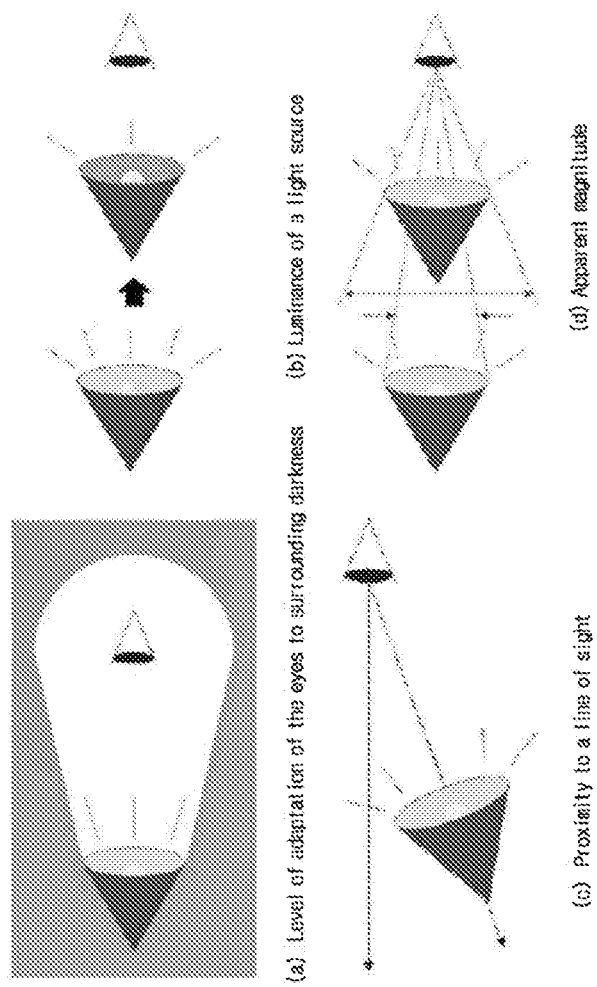
FIG. 7 is an explanatory view showing conditions that govern the level of glare.

From the point of view of a location relationship, the glare that directly enters the eyes because a high luminance portion that causes glare is close to a field of vision or line of sight is referred to as direct glare, and the glare that enters the eyes through reflection because a high luminance portion is away from a field of vision or line of sight is referred to as reflective glare. Meanwhile, from the point of view of functionality, the glare that interferes with viewing is classified as disability glare, and the glare that causes an unpleasant feeling is classified as discomfort glare. Direct factors of glare are a glare light source and luminance within a field of vision. As shown in FIG. 6, glare increases in proportion to the level of adaptation to surrounding darkness, the luminance of a light source, the proximity of a light source to a line of sight, and apparent magnitude.

Reflection from a brightly lit part of a lighting apparatus or window is a main factor that causes discomfort glare. Discomfort glare occurs because when there is a portion significantly brighter than an object in a field of vision, it is difficult to view the object and also the presence of glare is felt being uncomfortable.

Glare causes discomfort, and, in many long-term work cases, fatigue is caused and work efficiency is deteriorated. Such a discomfort glare feeling generally becomes stronger as the brightness and area of a glare light source are larger and an angle with a line of sight and the adaptive luminance of a worker are smaller or lower.

Discomfort glare is one of the psychological responses to a lighting environment. Accordingly, even when the same lighting stimulus is given, different responses may occur depending on environment or age. For example, as a person grows older, the size of his or her pupils becomes smaller, and his or her eyes receive a smaller amount of light. As a result of research using a first-degree light source at a background luminance of 6 cd/m$^2$, from the experimental data of the research showing the relationship between age and sensitivity to discomfort glare, it can be seen that a relationship slope varied depending on background luminance or light source size, and, above all, there was a relatively large variation depending on age.

Furthermore, the S/P ratio is the ratio between the sensitivity of a rod-like photoreceptor sensitive to blue light (scotopic vision) and the sensitivity of a conical photoreceptor sensitive to yellow light (photopic vision), among the two types of optical sensors of the retina. The S/P ratio is used to determine the ratio between the reaction intensity of the rod-like optical sensor and the reaction intensity of the conical optical sensor. The S/P ratio is measured as the ratio of the luminous flux of scotopic vision to the luminous flux of photopic vision on an ANSI reference ballast. Cool light (having a higher color temperature) has a higher S/P ratio than warm light (having a lower color temperature).

As shown in FIG. 3, it can be seen that in the case of single-color LED lighting, blue wavelength light has the highest glare rating (GR) value and in the case of white LED lighting, color temperature light in which the light strength of blue wavelength is relatively high has a higher discomfort GR value. Although a three-color LED PKG is used to control the S/P ratio, the efficiency thereof is low and the product price thereof is higher than that of a general white LED PKG using phosphor. In order to control glare, an LED, etc. needs to operate so that light is distributed at appropriate locations. Since glare is mostly caused by front-projected light and back-projected light within a vertical angle range of 60 and 90°, control needs to be performed such that a small amount of light within the vertical angle range of 60 and 90° is distributed.

Figure 4:
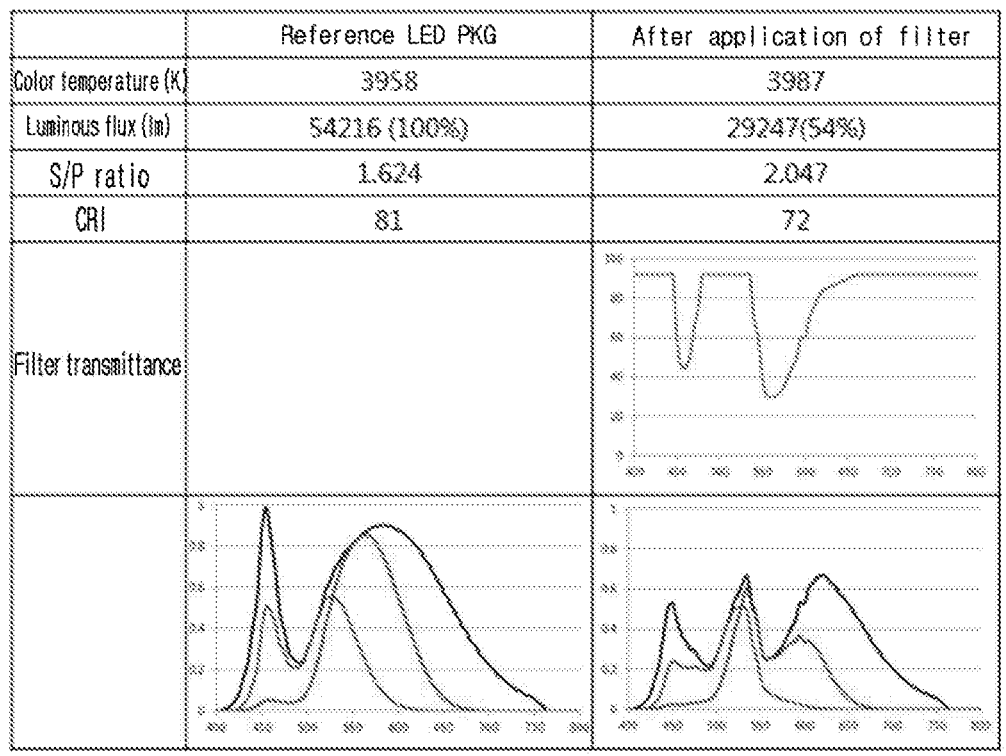
FIG. 4 is a reference view showing the results of variations in S/P ratio and color temperature (4000 K→4000 K)

FIGS. 4 and 5 show the results of previous research in which filter transmittance varied on a per wavelength basis. From these results, it was verified that the possibility of fabricating LED lighting capable of suppressing high S/P ratio and discomfort glare by decreasing blue wavelength light having a high discomfort GR value and light having a wavelength related to scotopic version.

Accordingly, in order to reduce a discomfort glare phenomenon and control S/P ratio, the light intensity of the wavelengths of a blue light series needs to be reduced. Therefore, in the present disclosure, in order to reduce this, there is used a filtering film 220 that is located in front of a white LED module and absorbs/blocks light having the wavelength of blue light in white light emitted from the white LED module.

Generally, when a driver drives a vehicle, there occurs a phenomenon in which visibility is deteriorated due to the light of a vehicle in an opposite lane or the fatigue of the eyes.

Visibility refers to the property that allows a shape and color to be visible. In other words, visibility refers to the property that allows the presence or shape of an object to be easily identifiable from a distance. When a color is well visible and can be easily identified by people, the expression "the color is highly visible" is used.

The presence of blue light included in the white light of a vehicle headlight acts as one of the causes of reduced visibility during operation. Therefore, according to one embodiment of the present invention, when the blue light absorbing/blocking filter film is adhered to a vehicle headlight, the film absorbs/blocks light having the wavelength of blue light emitted from the white light of the vehicle headlight, and thus an effect is achieved in that visibility during operation is improved.

For this purpose, there is provided a vehicle headlight in which a filtering film 220 configured to absorb/block blue light contained in the white light of a vehicle headlight is adhered, thereby improving visibility during operation. The filtering film 220 includes 25 to 90 parts by weight of an acrylic monomer, 4 to 30 parts by weight of a photoinitiator, 0.2 to 10 parts by weight of a leveling agent, and 3 to 15 parts by weight of a UV absorbent, based on 100 parts by weight of a urethane acrylate oligomer.

Among these constituent materials, the photoinitiator is an α-hydroxy ketone, and the leveling agent is polyether-modified trisiloxane or a silicon-based leveling agent. Furthermore, the UV absorber has a structure represented by Formula 1 below:

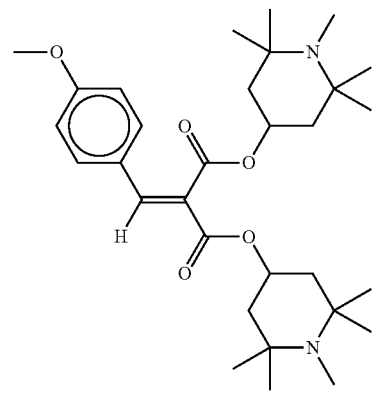

In the present disclosure, as a result of forming a coating film by adding the UV absorber, not only ultraviolet rays but also blue light in the wavelength range of 380 to 450 nm can be absorbed, and thus blue light can be effectively blocked. It is determined that the above operation results from the combined action of a methoxyphenyl methylene group and a pentamethyl piperidinyl group.

It is preferable that 3 to 15 parts by weight of the UV absorbent is included based on 100 parts by weight of the urethane acrylate oligomer. When the added amount of the UV absorber is less than 3 parts by weight, the effect of the addition is insufficient. Conversely, when the added amount of the UV absorber exceeds 15 parts by weight, yellowing may occur without a further effect.

Next, as another embodiment, the filtering film 220 may include: a liner 221 configured to come into contact with the surface of a vehicle headlight; a film base 222 configured to be adhered to the top surface of the liner 221; an adhesive 223 (not shown) configured to adhere the film base 222 and the liner 221 to each other; a top coating surface 224 configured to be applied to the top surface of the film base 222; and a protective surface 225 configured to be re-applied to the top surface of the top coating surface 224.

In other words, as shown in FIG. 6, the filtering film 220 has a quadruple structure including the liner 221, the film base 222, the top coating surface 224, and the protective surface 225. The liner 221, the film base 222, the top coating surface 224, and the protective surface 225 are each formed of a polyethylene phthalate (PET) or polycarbonate (PC) film, and are applied to the surface of the frame 210 in a multiple manner.

In this case, pluralities of fine grooves may be formed on the surfaces of the liner 221, the film base 222, the top coating surface 224, and the protective surface 225. A polarizing effect may be additionally applied by means of the patterns of the fine grooves, and a blue light blocking effect may be enhanced by further adding a UV absorbent to the fine grooves.

In another embodiment of the vehicle headlight for improving visibility during operation according to the present disclosure, a separate lens including the filtering film 220 configured to absorb/block blue light may be fabricated, a means configured to perform lifting and lowering in front of the vehicle headlight may be provided, and the vehicle headlight may be covered with the lens.

The lens is provided along with a sensor configured to detect an external environment, and is configured to operate according to the external environment detected by the sensor.

The sensor detects the external environment, such as weather, and operates such that the lens is selectively lifted and lowered in front of the vehicle headlight in snowy, rainy, or cloudy weather. This may be operable through the sensor and a microprocessor installed in the vehicle.

Furthermore, the sensor may be connected to a gear of a vehicle, and may selectively turn on and off the vehicle headlight by using the operation of the vehicle gear as a signal. The sensor operates via an input signal regarding the accelerator, RPM, brake, or clutch of a vehicle.

Figure 2:
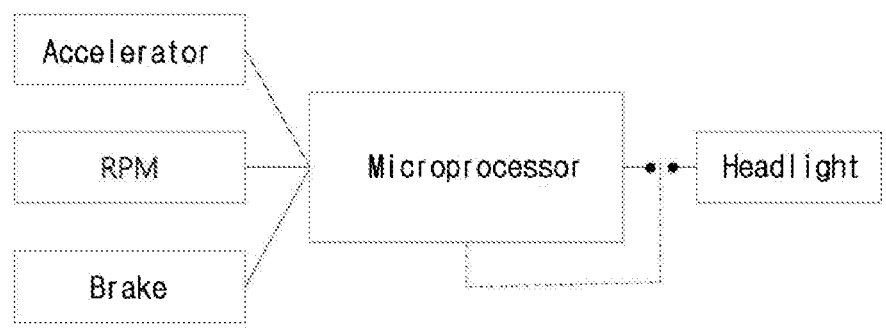
FIG. 2 is a schematic diagram showing a vehicle headlight system according to the present disclosure.

As shown in FIG. 2, when an input signal regarding the accelerator, RPM, brake, or clutch of a vehicle is input from the sensor, the input signal may be transferred to the microprocessor, and may operate the vehicle headlight via a control switch coupled to the vehicle headlight.

For example, when the vehicle stops, the microprocessor having received a brake signal of the vehicle turns off the vehicle headlight by operating the control switch. In contrast, when the vehicle starts, the microprocessor having received an accelerator signal of the vehicle turns on the vehicle headlight by operating the control switch.

Figure 8:
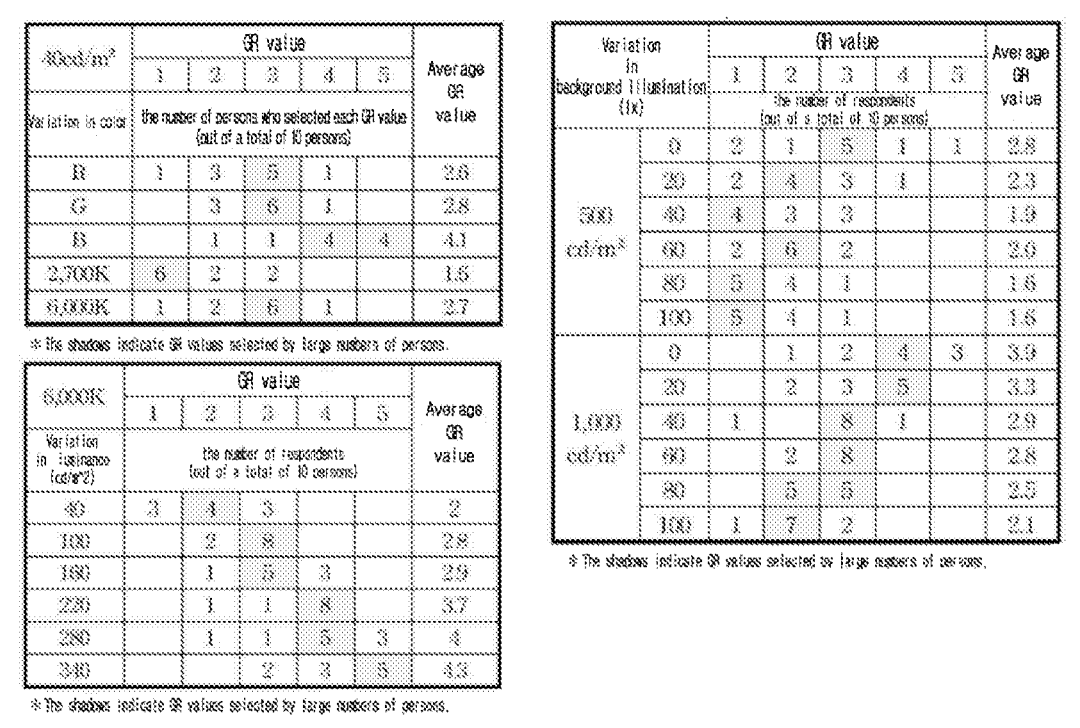

Meanwhile, as shown in FIG. 8, in TEST 1, the subjective evaluation of glare based on variations in ambient brightness was performed. When background brightness decreased from 100 lx to 0 lx, an average GR value was almost doubled. Accordingly, when the brightness of artificial lighting was reduced from 1,000 cd/m$^2$ to 500 cd/m$^2$, background brightness having the same glare had a difference of about 60 lx. In TEST 2 in which the subjective evaluation of glare for five colors was performed, the order of glare for the five colors was B>G>6,000 K>R>2,700 K, and white light produced weaker glare than original color light. The results B of TEST 3, which were obtained by comparing the differences between the levels of glare for respective colors in TEST 2 and the differences between the levels of glare at 6,000 K, showed a difference of about 8 times between the level of glare for the color of 6,000 K and the level of glare at a luminance of 40 cd/m2 of TEST 2. The difference was about 3 times in the case of G, and the difference was about 2 times in the case of R. In TEST 4, subjective evaluation was conducted on glare and irritation depending on turning on/off rate and color. As a result of analysis, glare was felt for the color having stronger glare and higher luminance as the result of TEST 2, and turning on/off rate had little influence. In connection with irritation, a bigger irritation was felt for a color having stronger glare and higher luminance, and turning on/off rate had little influence. However, at high brightness, irritation was felt regardless of turning on/off rate. The results of the present research are summarized as follows: it was found that at the same luminance, stronger glare was felt in a relatively dark residential area than in a commercial area where background brightness is relatively bright. Furthermore, even at the same luminance, there was a difference in glare up to 8 times depending on color, and there was a difference in irritation within the range of 1.5 to 2 times depending on turning on/off rate. Therefore, when it is necessary to improve light emission allowance standards or establish other lighting environment luminance standards, the influence of the color of light on glare, and the influences of turning on/off rate, background brightness, and luminance contrast between light sources must be taken into account.

As described above, the filtering film capable of preventing glare and reducing a discomfort glare phenomenon by controlling scotopic vision (S)/photopic vision (P) ratio in such a manner as to selectively absorb/block blue light in light emitted from an LED module is adhered, and thus the effect of supporting clearer viewing even when the illuminance of the vehicle headlight is low, thereby improving visibility.

The foregoing is intended to describe the features and technical advantages of the present disclosure in a rather broad manner in order to help the attached claims be better understood. It will be appreciated by those having ordinary knowledge in the art to which the present disclosure pertains that the present disclosure may be practiced in other specific forms without departing from the technical spirit or essential features of the present invention. Accordingly, the disclosed content is merely illustrative, and various alterations and modifications may be made by those having ordinary knowledge in the art to which the present disclosure pertains without departing from the scope of the claims. Therefore, the scope of the present disclosure is not limited to the above-described specific embodiments. The scope of the present disclosure is defined by the attached claims rather than the foregoing detailed description, and all alterations or modifications derived from the attached claims and their equivalents should be construed as being included within the scope of the present disclosure.

What is claimed is:

1. A vehicle headlight comprising:
   a vehicle headlight that generates substantially white light;
   a lens that is ascended to be disposed in front of the vehicle headlight or descended to be removed from the front of the vehicle headlight;
   a filtering film, which is adhered on a surface of the lens and absorbs blue light components included in the substantially white light;
   a sensor that generates an input signal associated with RPM, or operation of an accelerator, a brake, or a clutch of a vehicle, or external weather conditions; and
   a microprocessor that receives the input signal from the sensor,
   wherein the microprocessor is configured to:
      in response to receiving a brake signal of the vehicle, turn off the vehicle headlight; and
      in response to receiving an accelerator signal of the vehicle, turn on the vehicle headlight,
   wherein the filtering film comprises 25 to 90 parts by weight of an acrylic monomer, 4 to 30 parts by weight of a photoinitiator, 0.2 to 10 parts by weight of a leveling agent, and 3 to 15 parts by weight of a UV absorbent, based on 100 parts by weight of a urethane acrylate oligomer, and
   wherein the microprocessor is further configured to cause the lens to be ascended and disposed in front of the vehicle headlight in response to the sensor detecting adverse weather conditions.

2. The vehicle headlight system of claim 1, wherein the photoinitiator is an α-hydroxy ketone.

3. The vehicle headlight system of claim 1, wherein the leveling agent is polyether-modified trisiloxane or a silicon-based leveling agent.

4. The vehicle headlight system of claim 1, wherein the UV absorber is an ester-based UV absorber having a methoxyphenyl methylene group or a pentamethyl piperidinyl group.

5. The vehicle headlight system of claim 1 wherein the filtering film comprises:
   a liner adhered to a surface of the lens;
   a film base attached to a top surface of the liner;
   an adhesive that adheres the film base and the liner to each other;
   a top coating surface applied to a top surface of the film base; and
   a protective surface applied to a top surface of the top coating surface.

* * * * *